United States Patent
Lin

(10) Patent No.: US 9,188,803 B2
(45) Date of Patent: Nov. 17, 2015

(54) TOUCH PANEL

(71) Applicant: Chih-Chung Lin, Taipei (TW)

(72) Inventor: Chih-Chung Lin, Taipei (TW)

( * ) Notice: Subject to any disclaimer, the term of this patent is extended or adjusted under 35 U.S.C. 154(b) by 245 days.

(21) Appl. No.: 13/869,976

(22) Filed: Apr. 25, 2013

(65) Prior Publication Data

US 2014/0168535 A1   Jun. 19, 2014

(51) Int. Cl.
*G02F 1/1335* (2006.01)
*G02F 1/1333* (2006.01)
*G06F 3/041* (2006.01)
*G06F 1/16* (2006.01)

(52) U.S. Cl.
CPC ............ *G02F 1/13338* (2013.01); *G06F 1/169* (2013.01); *G06F 3/041* (2013.01); *G02F 1/133345* (2013.01); *G02F 1/133528* (2013.01)

(58) Field of Classification Search
CPC .......... G02F 1/13338; G02F 1/133528; G02F 1/133345
See application file for complete search history.

(56) References Cited

U.S. PATENT DOCUMENTS

| 2009/0096763 A1* | 4/2009 | Hinata ......................... 345/174 |
| 2009/0160817 A1* | 6/2009 | Wu et al. ...................... 345/173 |
| 2011/0043465 A1* | 2/2011 | Huang et al. .................. 345/173 |
| 2012/0006585 A1* | 1/2012 | Chikahisa .................... 174/257 |

* cited by examiner

*Primary Examiner* — Michael Caley
*Assistant Examiner* — Edmond Lau
(74) *Attorney, Agent, or Firm* — C. G. Mersereau; Nikolai & Mersereau, P.A.

(57) ABSTRACT

A touch panel includes a substrate, a shielding layer, a first electrode layer, a first insulation layer, a second electrode layer, a lead layer and a second insulation layer. The substrate has a touch section and a non-touch section. The shield layer and the lead layer are disposed on the non-touch section. The first and second electrode layers are disposed on touch section. The first insulation layer is disposed between the first and second electrode layers corresponding to the second electrode layer. The second insulation layer is overlaid on the second electrode layer and the lead layer. In the touch panel, the number of leads is reduced. Moreover, the touch panel is free from the problems of interference and signal interference between the electrodes.

8 Claims, 5 Drawing Sheets

TOUCH PANEL

BACKGROUND OF THE INVENTION

1. Field of the Invention

The present invention relates generally to a touch panel, and more particularly to a touch panel in which the number of leads is reduced. Moreover, the touch panel is free from the problems of interference and signal interference between the electrodes.

2. Description of the Related Art

In recent years, along with the development of touch panel techniques, various portable electronic devices with display function, such as intelligent mobile phones and tablets, have employed touch panels instead of the traditional mechanical keyboards that occupy much room.

In the existent touch panels, most of the touch panels adopted in the portable electronic devices are capacitive touch panels. An ordinary capacitive touch panel includes a transparent substrate. An indium tin oxide (ITO) layer is disposed on a bottom face of the transparent substrate. The periphery of the bottom face serves as a wiring section. Multiple electrodes are formed on the indium tin oxide (ITO) layer. Multiple leads are disposed on the wiring section and electrically connected to the electrodes respectively. The leads are non-transparent bodies. Therefore, it is necessary for the electronic device manufacturer to spray an ink layer on the periphery of a bottom section of a protection board and dispose an adhesive layer on a top face of the touch panel for adhering the touch panel to the protection board. The ink layer of the bottom face of the protection board corresponds to the wiring section of the touch panel for concealing the leads arranged in the wiring section of the touch panel. The ink layer and the adhesive layer not only lead to increase of manufacturing cost and material cost of the electronic device, but also lead to increase of the total thickness of the electronic device. As a result, the portable electronic device can be hardly slimmed, miniaturized and lightened. The above problems must be solved.

To solve the above problems, in some conventional capacitive touch panels, the transverse electrodes and the longitudinal electrodes are disposed on the same plane and finely wired so as to reduce the total thickness. However, the transverse electrodes and the longitudinal electrodes are so closely arranged as to interfere with each other. Also, the distance between the transverse electrodes and the longitudinal electrodes is so short that short circuit or signal interference between the transverse electrodes and the longitudinal electrodes is likely to take place. According to the above, the conventional touch panel has the following shortcomings:
1. The manufacturing cost of the conventional touch panel is higher.
2. The electrodes of the conventional touch panel are likely to interfere with each other.
3. Signal interference between the electrodes is likely to take place.

SUMMARY OF THE INVENTION

It is therefore a primary object of the present invention to provide a touch panel, which is free from the problem of interference or signal interference between the electrodes.

To achieve the above and other objects, the touch panel of the present invention includes a substrate, a shielding layer, a first electrode layer, a first insulation layer, a second electrode layer, a lead layer and a second insulation layer. The substrate has a touch section and a non-touch section positioned on a periphery of the touch section. The shield layer is disposed on the non-touch section. The first electrode layer is disposed on touch section to partially extend to the non-touch section. The first insulation layer is overlaid on one side of the first electrode layer. The second electrode layer is disposed on the other side of the first insulation layer, which side is distal from the first electrode layer corresponding to the touch section. The second electrode layer partially extends to the non-touch section. The lead layer is disposed on the non-touch section corresponding to the shield layer and electrically connected to the first and second electrode layers. The second insulation layer is overlaid on the second electrode layer and the lead layer. By means of the structural arrangement of the present invention, the interference or signal interference between the electrodes is avoided.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
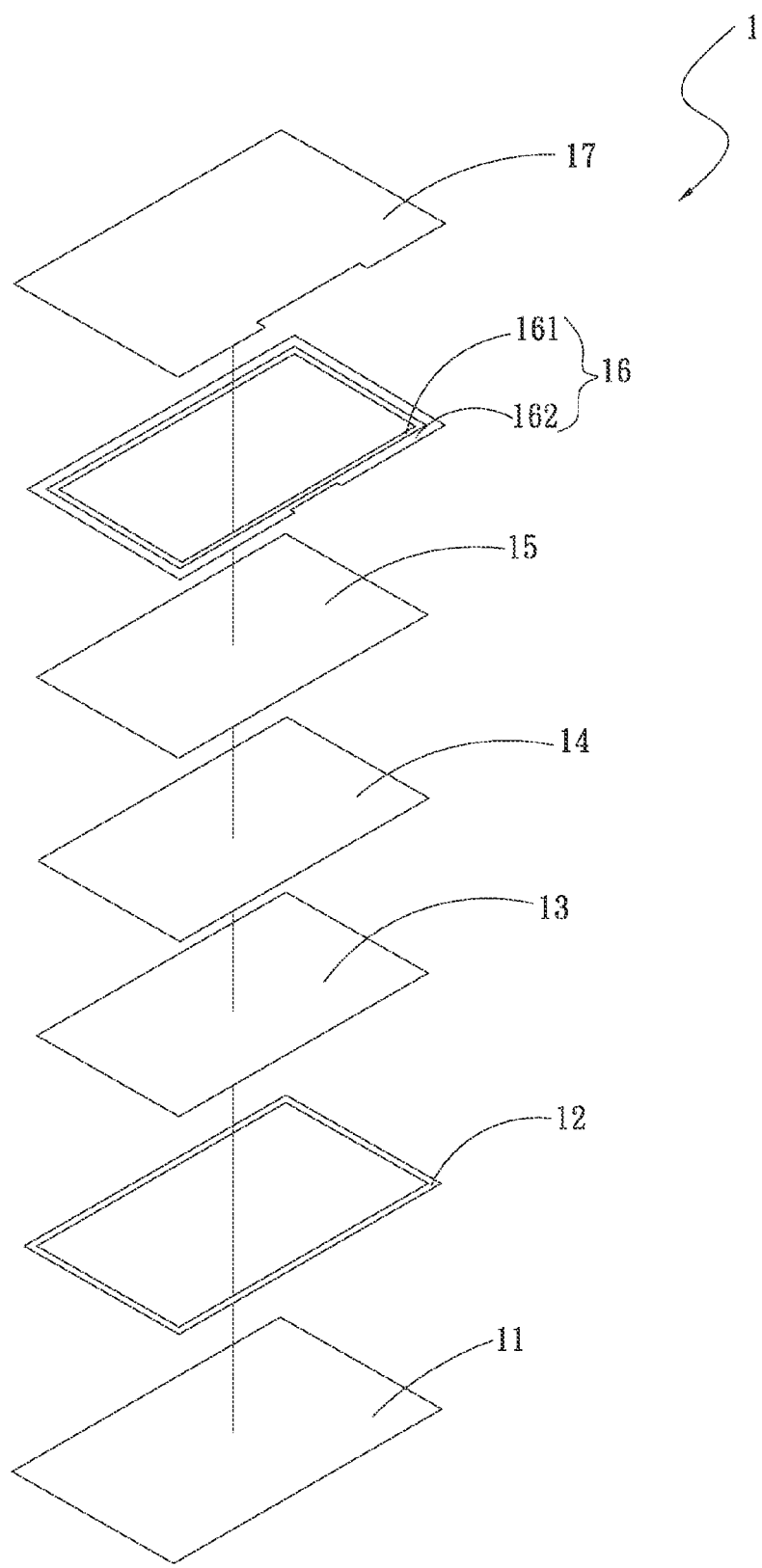
FIG. 1 is a perspective exploded view of a first embodiment of the touch panel of the present invention.
Figure 2:
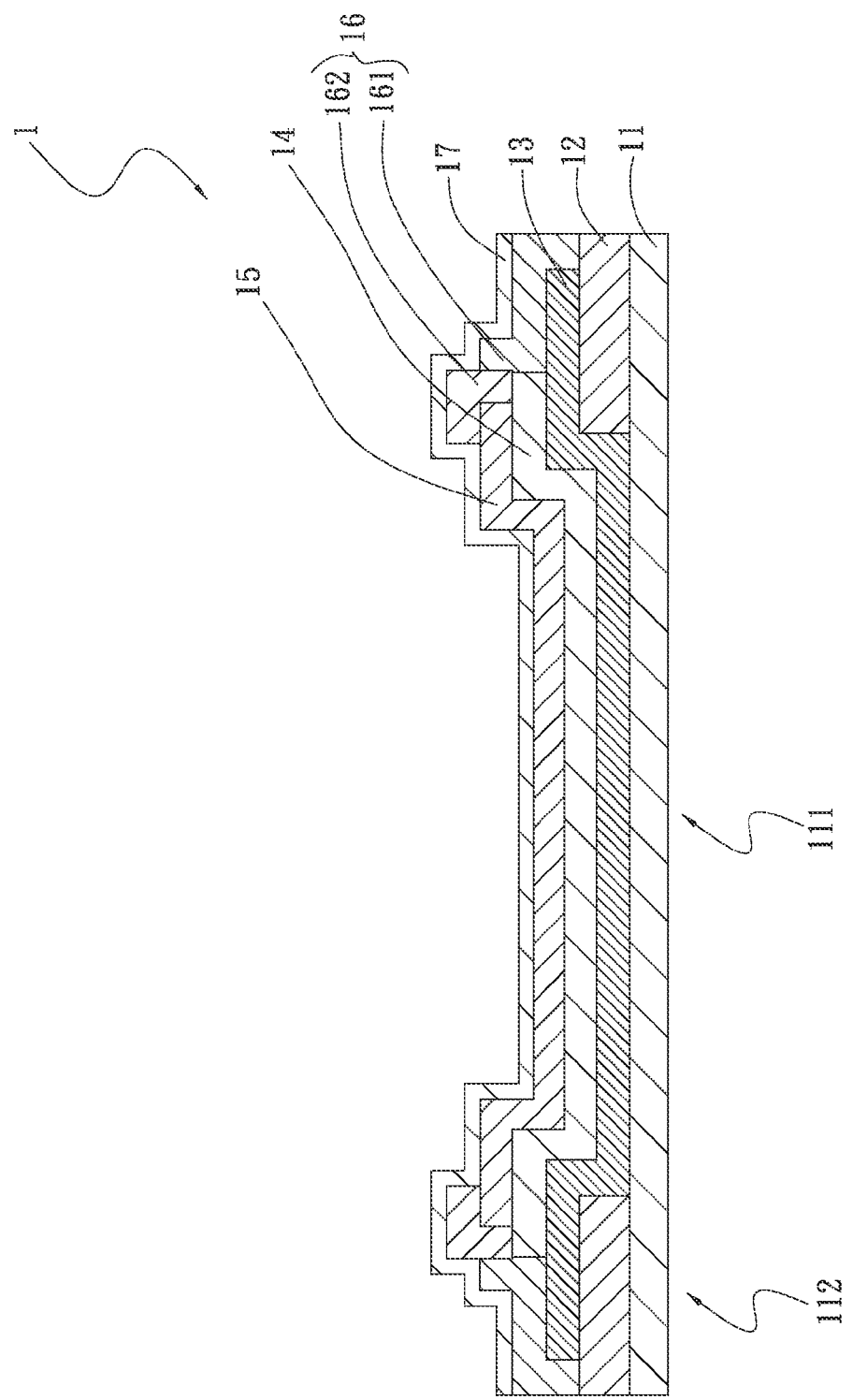
FIG. 2 is a sectional view of the first embodiment of the touch panel of the present invention.

Please refer to FIGS. 1 and 2. FIG. 1 is a perspective exploded view of a first embodiment of the touch panel of the present invention. FIG. 2 is a sectional view of the first embodiment of the touch panel of the present invention. According to the first embodiment, the touch panel 1 of the present invention includes a substrate 11, a shielding layer 12, a first electrode layer 13, a first insulation layer 14, a second electrode layer 15, a lead layer 16 and a second insulation layer 17.

The substrate 11 has a touch section 111 and a non-touch section 112 positioned on a periphery of the touch section 111 around the touch section 111.

The shield layer 12 is disposed on the non-touch section 112. The shield layer 12 is formed of a nontransparent ink and disposed on the non-touch section 112 by means of printing or attachment. Alternatively, the shield layer 12 is a nontransparent attachment sheet disposed on the non-touch section 112 for concealing the lead layer 16.

The first electrode layer 13 is disposed on touch section 111 to partially extend to the non-touch section 112 and is partially overlaid on the shield layer 12. The first insulation layer 14 is overlaid on the other side of the first electrode layer 13, which side is distal from the substrate 11. The first insulation layer 14 is such positioned as to completely cover the part of the first electrode layer 13 that is disposed on the touch section 111. The first insulation layer 14 also partially covers the part of the first electrode layer 13 that is disposed on the non-touch section 112.

The second electrode layer 15 is disposed on the other side of the first insulation layer 14, which side is distal from the first electrode layer 13 corresponding to the touch section 111. The second electrode layer 15 partially extends to the non-touch section 112. The lead layer 16 is disposed on the non-touch section 112 corresponding to the shield layer 12 and is electrically connected to the first and second electrode layers 13, 15. The second insulation layer 17 is overlaid on the other side of the second electrode layer 15, which side is distal from the first insulation layer 14 to cover the lead layer 16.

The lead layer 16 has a first lead 161 and a second lead 162. The first lead 161 is electrically connected to the first electrode layer 13, while the second lead 162 is electrically connected to the second electrode layer 15.

The first and second insulation layers 14, 17 are formed of transparent insulation material or silicon oxide.

The substrate 11 is made of glass or polymer material.

Figure 3:
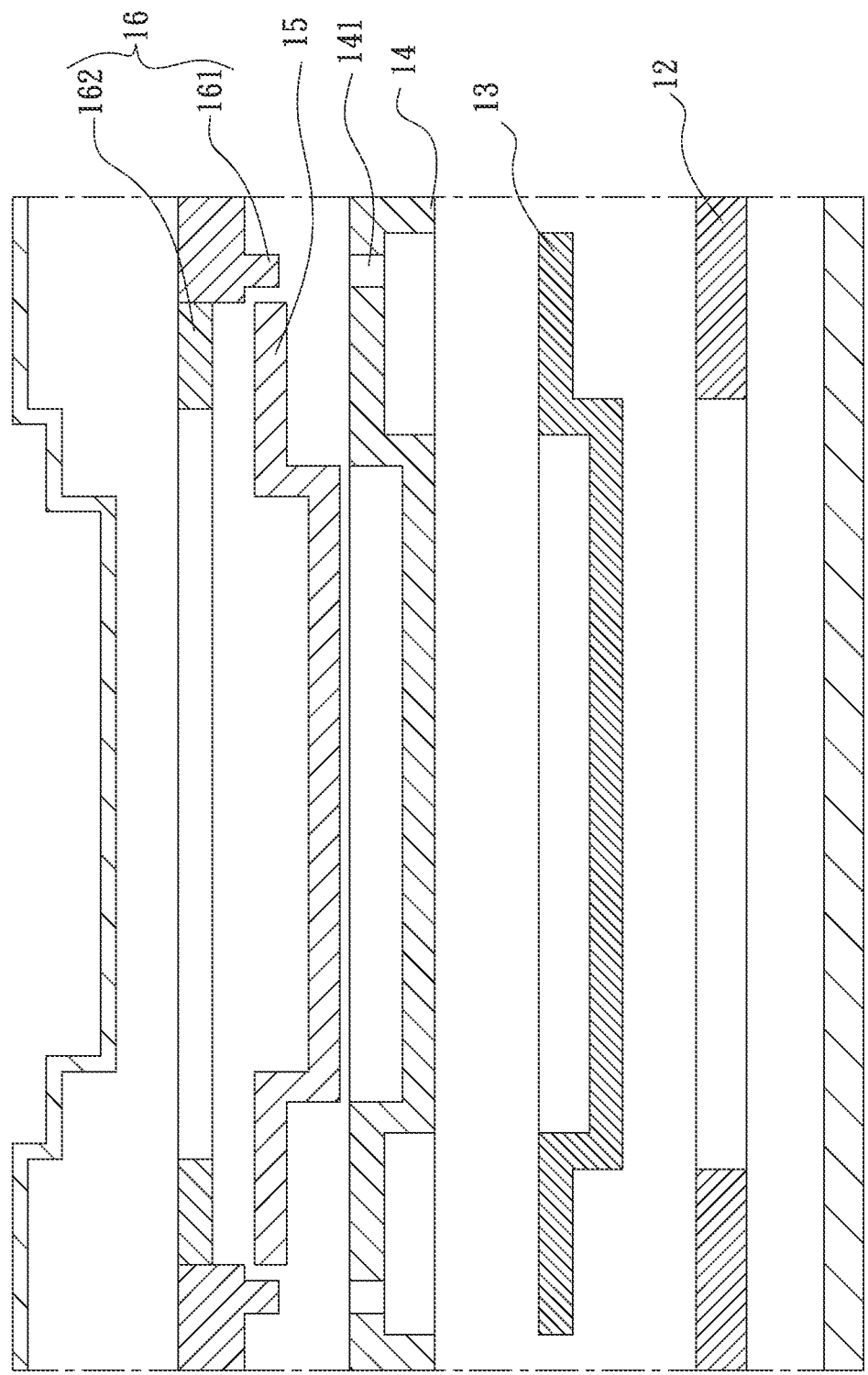
FIG. 3 is a sectional exploded view of a second embodiment of the touch panel of the present invention.
Figure 4:
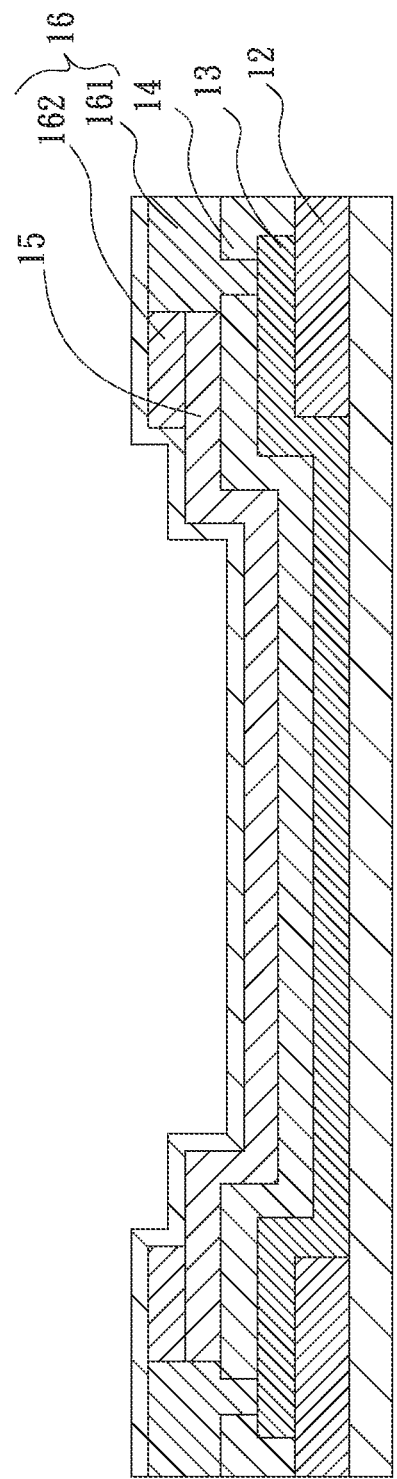
FIG. 4 is a sectional assembled view of the second embodiment of the touch panel of the present invention.

Please now refer to FIGS. 3 and 4. FIG. 3 is a sectional exploded view of a second embodiment of the touch panel of the present invention. FIG. 4 is a sectional assembled view of the second embodiment of the touch panel of the present invention. The second embodiment is substantially identical to the first embodiment in technical characteristic and thus will not be repeatedly described hereinafter. The second embodiment is different from the first embodiment in that the first insulation layer 14 also covers the first electrode layer 13 and the shield layer 12. The part of the first insulation layer 14 that is positioned on the non-touch section 112 is formed with multiple through holes 141. The first lead 161 of the lead layer 16 passes through the through holes 141 to electrically connect with the first electrode layer 13.

Figure 5:
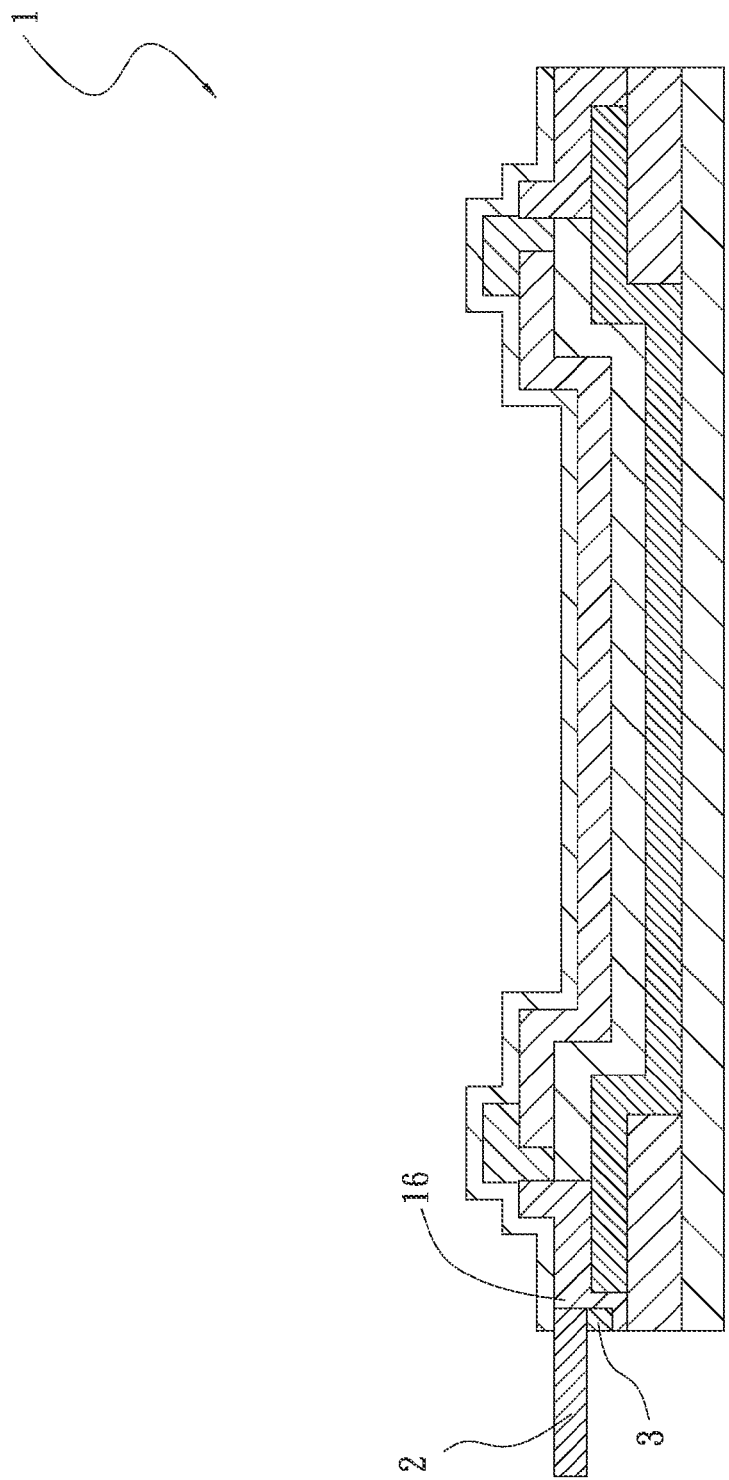
FIG. 5 is a sectional view of a third embodiment of the touch panel of the present invention.

Please now refer to FIG. 5, which is a sectional assembled view of a third embodiment of the touch panel of the present invention. The third embodiment is substantially identical to the first embodiment in technical characteristic and thus will not be repeatedly described hereinafter. The third embodiment is different from the first embodiment in that the touch panel 1 further includes a flexible circuit board 2. A conductive adhesive 3 is disposed between the flexible circuit board 2 and the lead layer 16 to electrically connect the flexible circuit board 2 with the lead layer 16.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch panel comprising:
   a substrate having a touch section and a non-touch section positioned on a periphery of the touch section;
   a shield layer disposed on the non-touch section and covering one side of the substrate;
   a first electrode layer disposed on touch section to partially extend to the non-touch section and covering one side of the shield layer, which side is distal from the substrate;
   a first insulation layer overlaid on one side of the first electrode layer, which side is distal from the substrate to completely cover the part of the first electrode layer disposed on the touch section, the first insulation layer also partially covering the part of the first electrode layer disposed on the non-touch section;
   a second electrode layer disposed on the other side of the first insulation layer, which side is distal from the first electrode layer corresponding to the touch section, the second electrode layer partially extending to the non-touch section;
   a lead layer disposed on the non-touch section corresponding to the shield layer and having a first lead and a second lead, the first lead covering one side of the first electrode layer, which side is distal from the first insulation layer to electrically connect to the first electrode layer, while the second lead covers the second electrode layer and the first insulation layer to electrically connect to the second electrode layer; and
   a second insulation layer overlaid on the second electrode layer and the lead layer.

2. The touch panel as claimed in claim 1, wherein the first and second insulation layers are formed of transparent insulation material.

3. The touch panel as claimed in claim 1, wherein the first and second insulation layers are formed of silicon oxide.

4. The touch panel as claimed in claim 1, wherein the substrate is made of glass or polymer material.

5. The touch panel as claimed in claim 1, wherein the second insulation layer is overlaid on the other side of the second electrode layer, which side is distal from the first insulation layer.

6. The touch panel as claimed in claim 1, further comprising a flexible circuit board, a conductive adhesive being disposed between the flexible circuit board and the lead layer to electrically connect the flexible circuit board with the lead layer.

7. The touch panel as claimed in claim 1, wherein a part of the first insulation layer that is positioned on the non-touch section is formed with multiple through holes.

8. The touch panel as claimed in claim 7, wherein the lead layer has a first lead and a second lead, the first lead passing through the through holes to electrically connect with the first electrode layer, the second lead being electrically connected to the second electrode layer.

\* \* \* \* \*